United States Patent [19]
Norby

[11] Patent Number: 5,965,646
[45] Date of Patent: *Oct. 12, 1999

[54] THERMOSET CROSSLINKABLE PRE-APPLIED ADHESIVE

[75] Inventor: David B. Norby, Columbus, Ohio

[73] Assignee: Ashland Inc., Dublin, Ohio

[ * ] Notice: This patent issued on a continued prosecution application filed under 37 CFR 1.53(d), and is subject to the twenty year patent term provisions of 35 U.S.C. 154(a)(2).

[21] Appl. No.: 08/835,629

[22] Filed: Apr. 9, 1997

[51] Int. Cl.$^6$ .............. C08K 5/17; C08L 75/04; C08L 61/28
[52] U.S. Cl. ............ 524/247; 524/501; 524/507; 524/512
[58] Field of Search ................. 524/236, 247, 524/501, 507, 512, 457

[56] References Cited

U.S. PATENT DOCUMENTS

| | | | |
|---|---|---|---|
| 4,420,583 | 12/1983 | Hutton | 524/501 |
| 4,752,269 | 6/1988 | Bonk | 525/163 |
| 4,948,829 | 8/1990 | Mitsuji et al. | 524/501 |

FOREIGN PATENT DOCUMENTS

| | | | |
|---|---|---|---|
| 590843 | of 0000 | European Pat. Off. | |
| 2218426 | 11/1989 | United Kingdom | 524/501 |

OTHER PUBLICATIONS

*Amino Coating resins, Their Invention and Reinvention*, Cytec, 1995, compiled, edited and written by Albert Kirsch.
Zeneca, Resins NeoTac R–9617, Feb. 1993.
Zeneca Resins NeoTac XR–9621, Feb. 1993.

*Primary Examiner*—Peter A. Szekely
*Attorney, Agent, or Firm*—Martin Connaughton; Mary E. Picken

[57] ABSTRACT

This invention is a preapplied liquid adhesive whose components, when dried and heated, react to form a polymer. Laminates made with the thermoset adhesive withstand exposure to 240° F. (116° C.). The adhesive combines urethane dispersions, carboxyl functional acrylic latices and tertiary amine blocking agent.

6 Claims, No Drawings

THERMOSET CROSSLINKABLE PRE-APPLIED ADHESIVE

This invention relates to thermoset adhesives preapplied to vinyl substrates or release films supplied as free films for subsequent heat reactivating application and bonding to another substrate.

BACKGROUND OF THIS INVENTION

Most pre-applied adhesives are pressure-sensitive adhesives and are not heated after application by the consumer. A recent development with pre-applied adhesives is a heat activated adhesive. Pre-applied adhesives may be prepared from hot melt adhesives; either non-reactive thermoplastic adhesive or reactive thermoset adhesive. They may also be prepared from water borne emulsions or dispersions, which are currently available only as the non-reactive thermoplastic systems. No reactive thermoset water borne pre-applied adhesives are currently available. Reactive hot melt adhesives are on the market although not in the form of a pre-applied storage stable adhesive. There is a need to fill this void for a reactive thermoset water borne pre-applied system.

In this invention, water borne adhesive systems are applied to the surface of a metal, vinyl, wood or plastic substrate. For example, a thin film of liquid adhesive is applied to and dried on a roll of vinyl. This roll which now has the pre-applied adhesive on the back of the vinyl is shipped to a manufacturer who heat laminates the vinyl usually to a rigid substrate, such as, a wood door or sheets of cold rolled steel or plastic. The advantage of the pre-applied method is elimination of all liquid chemicals from the final manufacturer's laminating facility. The pre-applied method also provides uniformity in application which results in improved quality of the final product. This invention is a water borne pre-applied system that when heat activated (at the final manufacturers facility) forms a thermoset adhesive bond. This thermoset bond, in contrast to commercially available thermoplastic bond coats, adds additional performance properties that are needed in the market place. The most critical performance need for pre-applied adhesives, second only to the adhesive bond strength, is heat resistance of the final product. The pre-applied adhesive is applied and dried on a roll of vinyl, foam or cloth. The end user of this roll of goods would like to have a processing procedure to heat activate and bond the unrolled goods to a surface at some minimum activation temperature. The lower the heat activation temperature the less the distortion of the final product. The service conditions of the final product often encounter elevated temperatures. In automotive applications for example, it is not uncommon to need performance properties for heat resistance for interior parts of 200° F. because car interiors can reach such a temperature in the summer.

This invention is a waterborne thermoset system that can be dried on rolled goods, stored, and then heat activated at a later date at a relatively low activation temperature. The laminate exhibits unique elevated temperature heat resistant properties superior to the heat resistance of conventional thermoplastic adhesives. Longer press times permit lower activation temperatures and shorter press times require higher activation temperatures.

DETAILED DESCRIPTION OF THE INVENTION

The first ingredient of the adhesive of the invention is a urethane dispersion such as the aliphatic polyester water-borne urethane dispersions available from Zeneca Resins as NEOREZ R-9617 and R9621 dispersions.

The second ingredient of the adhesive of this invention is a carboxy-modified reactive acrylic latex such as that available as Hycar 26084 carboxy-modified acrylic latex from BF Goodrich, Cleveland, Ohio. The preferred latex lacks any other functionality than carboxyl functionality at 6.3 acid value, and hydroxyl functionality at hydroxyl value 5.

The third ingredient of the adhesive of this invention is a tertiary amine such as N,N-Diethylethanolamine or N-N-Dimethylethanolamine. The preferred amines have vapor pressures from 1 to 4 mm mercury at 20° C. The most preferred amine is diethyl ethanolamine.

The fourth ingredient is a melamine-formaldehyde resin having imino (—NH) functionality such as Cymel 327 resin or Cymel 323 resin from Cytec, West Paterson, N.J. The preferred resin has 1 to 2.5 triazine units per molecule. The most preferred resin has methoxy methyl-imino functionality and 1.75 triazine groups per molecule.

Laminates using the adhesive of the invention can be made with vinyl and metal or wood. Useful vinyl substrates are available from Uniroyal Engineered Products, Port Clinton, Ohio. Useful foam backed vinyl substrates include those from Foamex International, Auburn, Ind. Among the useful wood substrates are those from Mills Pride, Waverly, Ohio. Useful metal substrates are available from ACT Laboratories, Hillsdale, Mich.

A preferred adhesive formulation is 10 to 30 parts acrylic latex, 70 to 85 parts polyurethane dispersion, 0.2 to 1.0 part fugitive tertiary amine, and 1 to 3 parts melamine formaldehyde resin. Another preferred adhesive formulation is 20 parts acrylic latex, 77 parts polyurethane dispersion, 0.6 parts fugitive tertiary amine, and 1.0 part melamine formaldehyde resin. The adhesive pH is greater than or equal to 7 and the acrylic latex has carboxyl and hydroxyl functional groups.

In the following Examples all measurements are in the metric system and all parts are by weight unless otherwise noted. All references mentioned herein are specifically incorporated by reference.

EXAMPLE 1

The control water-borne thermoplastic preapplied adhesive was a mixture of:

60 g Zeneca R9621 urethane dispersion[1]

20 g Zeneca R9617 urethane dispersion[1]

0.02 g Proxel 6XL 1,2 benzisothiazolin-3-one preservative[2]

Drewplus L-407 modified polysiloxane copolymer emulsion foam control agent[3]

0.06 g Aquasperse 11877-7226 phthaloblue color[4]

Nopco DSX-1550 nonionic associative thickener rheology modifier[5]

20.0 g Hycar 26084 carboxy-modified reactive acrylic latex[6]

1 Zeneca, Wilmington, Mass.
2 ICI, Wilminton, Del.
3 Ashland Inc., Boonton, N.J.
4 HÜLS America, Piscataway, N.J.
5 Henkel, Ambler, Pa.
6 BF Goodrich, Cleveland, Ohio The adhesive was prepared by blending the ingredients in the order listed.

EXAMPLE 2

The thermoset adhesive of this invention was prepared by combining 44 g Zeneca R-9621 urethane dispersion 33 g Zeneca R9617 urethane dispersion 0.01 Proxel 6XL 1,2 benzisothiazolin-3-one preservative 0.01 Drewplus L-407 foam control agent 0.11 g Aquasperse 11877-7226 phthaloblue color 0.33 g Nopco DSX-1550 rheology modifier 20.4 g Hycar 26084 carboxy-modified reactive acrylic latex 0.55 g Diethylethanolamine[7]

1.54 g Cymel 327 melamine resin crosslinker[8]

Surfynol 440 wetting agent, produced by reacting ethylene oxide with a nonionic molecule with a hydrophilic section in the middle of two symmetric hydrophobic groups.[9]

[7] Union Carbide, Danbury, Conn.
[8] Cytec, West Paterson, N.J.
[9] Air Products & Chemicals, Allentown, Pa.

These formulations were applied to the foam side of foam backed vinyl from Foamex International, Auburn, Ind. and then to vinyl from Uniroyal Engineered Products, Port Clinton, Ohio, then dried, and were then heat activated. Both adhesives showed the same adhesive bond at room temperature, but only the Example 2 crosslinked thermoset adhesive formulation passed the following heat resistance tests:

TABLE 1

HEAT RESISTANCE TEST

|  | OVEN TEMP | TIME IN OVEN | HANGING WEIGHT | RESULT |
|---|---|---|---|---|
| Example 2 | 225° F. | 24 Hours | 30 Grams | PASS |
| Thermoset | 101° C. | 24 Hours | 30 Grams | PASS |
| Adhesive | 225° F. | 24 Hours | 30 Grams | PASS |
|  | 101° C. | 24 Hours | 30 Grams | PASS |
|  | 185° F. 85° C. |  |  |  |
|  | 185° F. 85° C. |  |  |  |
| Example 1 | 185° F. 85° C. | 4 Hours | 30 Grams | FAIL |
| Control | 185° F. 85° C. | 3 Hours | 30 Grams | FAIL |
| Thermoplastic Adhesive | 185° F. 85° C. | 6 Hours | 10 Grams | FAIL |

The heat resistance is believed to derive from some crosslinking of the amino resin. The choice of amino resin and its stabilization in the formula are unique aspects of the system. Most amino resins will react under acidic conditions. Even a weak acid such as a carboxyl group can catalyze the reaction. To maximize stability of the formulation an amine such as diethylethanol amine with the proper vapor pressure of from 1 to 4 mm Hg at 20° C. serves to block or neutralize any acidic groups. The amine blocking agent being fugitive can be driven off at certain higher temperatures, but remains in the adhesive film at ambient temperatures. The choice of amino resin is also important. The partially methylated melamine-formaldehyde resins require very strong acid catalysis, heat and dwell time and although are quite stable, they are difficult to react. High imino melamine-formaldehyde resins are best. The best of both worlds can be achieved, i.e. the balance of shelf stability vs. cure response.

The following Table 2 shows shelf stability of the dried film at elevated temperatures.

TABLE 2

|  | STORAGE STABILITY TIME | SUBSEQUENT ABILITY TO CROSS LINK |
|---|---|---|
| Example 1 (Thermoplastic) | 13 Days/120° F. | PASS |
| Example 2 (Thermoset) | 12 Days/120° F. | FAIL |
|  | a) 30 Days/95° F. at 30 Days R.T. and then | PASS |
|  | b) 10 Days/95° F. | PASS |

Table 2 shows that the dried film adhesive of this invention is stable at 120° F. for 12 days. It passed 40 days of shelf stability testing at 95° F. The preferred formulation according to Table 3 below had heat resistance up to 240° F. at 60 seconds.

TABLE 3

TIME & TEMPERATURE FOR CROSSLINK OF FILM FROM PREAPPLIED THERMOSET ADHESIVE OF EXAMPLE 2

| CURE CONDITIONS OF DRIED FILM | | | HEAT RESISTANCE |
|---|---|---|---|
| PLATEN (° F.) | DWELL (SEC.) | PSI | 240° F./250 gr LOAD |
| 280 | 20 | 4 | PASS |
| 270 | 20 | 4 | PASS |
| 260 | 20 | 4 | FAIL |
| 260 | 30 | 4 | PASS |
| 240 | 30 | 4 | FAIL |
| 240 | 60 | 4 | PASS |
| 230 | 60 | 4 | PASS |
| 220 | 60 | 4 | FAIL |

The dried adhesive film was placed between a Bondrite-1000 iron phosphated steel panel and vinyl, then placed on the platen for 10 seconds to bring it up to temperature. It was then pressed, the adhesive bond line temperature was very close to the platen temperature. The test was run at room temperature. The film was 7 days old.

Review of Table 3 reveals that a certain temperature and certain time are required to crosslink the adhesive film of the invention.

TABLE 4

THERMOSET vs THERMOPLASTIC HEAT RESISTANCE

|  | CURE CONDITIONS OF DRIED FILM | | | HEAT RESISTANCE 240° F./ |
|---|---|---|---|---|
|  | PLATEN (° F.) | DWELL (SEC) | PSI | 250 GR LOAD |
| Example 2 thermoset adhesive | 230 | 60 | 4 | PASS |
| Example 1 thermoplastic adhesive | 230 | 60 | 4 | 30 min. - fail (no crosslinker) |

Review of Table 4 reveals that the melamine formaldehyde resin crosslinker and amine are essential in the adhesive of this invention.

The dried adhesive film of this invention has been shown to be shelf stable on rolled vinyl goods for as long as 120 days at 70° F. The stored vinyl film rolls, after application to a solid substrate and heat activation at 230° F., passes the overnight heat resistance test at 240° F. with a 250 gm load.

I claim:

1. A reactive thermoset adhesive composition useful for laminating substrates comprising a) an acrylic latex having carboxyl functional groups, b) a polyurethane dispersion, c) a fugitive tertiary amine having a vapor pressure at 20 degrees C. of 1 to 4 mm Hg selected from the group consisting of I) diethylethanolamine, and ii) dimethylethanolamine, and d) 1 to 3 parts of a methoxymethyl imino melamine formaldehyde resin.

2. The adhesive of claim 1 having ph ≧7.

3. The adhesive of claim 1 wherein said acrylic latex has carboxyl and hydroxyl functional groups.

4. The adhesive of claim 1 wherein said acrylic latex functionality consists essentially of hydroxyl and carboxyl groups.

5. The adhesive of claim 1 comprising 10 to 30 parts acrylic latex, 70 to 85 parts polyurethane dispersion, 0.2 to 1.0 parts tertiary amine, and 1 to 3 parts melamine formaldehyde resin.

6. The adhesive of claim 1 comprising 20 parts acrylic latex 77 parts polyurethane dispersion 0.6 parts tertiary amine, and 1.5 parts melamine formaldehyde resin.

* * * * *